(12) United States Patent
Novak et al.

(10) Patent No.: US 6,708,002 B1
(45) Date of Patent: Mar. 16, 2004

(54) MODULAR MULTIPLEXING/ DEMULTIPLEXING UNITS IN OPTICAL TRANSMISSION SYSTEMS

(75) Inventors: Dalma Novak, Columbia, MD (US); Bo Pedersen, Annapolis, MD (US); Quan Zhen Wang, New York, NY (US)

(73) Assignee: Dorsal Networks, Inc., Columbia, MD (US)

( * ) Notice: Subject to any disclaimer, the term of this patent is extended or adjusted under 35 U.S.C. 154(b) by 0 days.

(21) Appl. No.: 10/046,207

(22) Filed: Jan. 16, 2002

(51) Int. Cl.[7] .................................................. H04J 14/02
(52) U.S. Cl. ............................. 398/79; 398/81; 398/82; 398/84; 398/91; 398/141; 398/147; 398/148; 385/24; 385/37; 385/27
(58) Field of Search .............................. 398/81, 79, 82, 398/84, 141, 147, 148; 385/24, 37, 27

(56) References Cited

U.S. PATENT DOCUMENTS

| | | | |
|---|---|---|---|
| 5,557,439 A | | 9/1996 | Alexander et al. .......... 359/124 |
| 6,021,235 A | * | 2/2000 | Yamamoto et al. ........... 385/24 |
| 6,091,538 A | * | 7/2000 | Takeda et al. .............. 359/341 |
| 6,271,948 B1 | * | 8/2001 | Toyohara .................... 359/127 |
| 6,292,603 B1 | | 9/2001 | Mizuochi et al. ............. 385/24 |
| 6,404,948 B2 | * | 6/2002 | Alexander et al. ............ 385/24 |

OTHER PUBLICATIONS

Patent Application Publication (Zhou et al) Pub No. 2002/ 0021862 A1.*
AT&T Technical Journal: A Journal of the AT&T Companies, vol. 74, No. 1, Jan./Feb. 1995, 106 pages.

* cited by examiner

*Primary Examiner*—Leslie Pascal
*Assistant Examiner*—Hanh Phan
(74) *Attorney, Agent, or Firm*—Harrity &Snyder, L.L.P.

(57) ABSTRACT

An optical transmission system includes a number of corresponding modular multiplexing and demultiplexing units used in transmitting and receiving an optical signal respectively. Additionally, compensation components compensate for optical dispersion experienced by the optical signal. The modular multiplexing and demultiplexing units are assembled in a cascade fashion at the transmit side and the receive side of the optical transmission system, respectively. The dispersion compensation components share dispersion compensation fiber across the cascaded units.

16 Claims, 9 Drawing Sheets

MODULAR MULTIPLEXING/ DEMULTIPLEXING UNITS IN OPTICAL TRANSMISSION SYSTEMS

FIELD OF THE INVENTION

The present invention relates generally to optical transmission systems and, more particularly, to systems and methods for efficiently multiplexing/demultiplexing transmission channels in an optical transmission system.

BACKGROUND OF THE INVENTION

Optical systems transmit information as optical signals through optical fiber. When sending optical signals over long distances, a number of optical channels may be simultaneously transmitted over a long length of fiber. Each of the optical channels correspond to a light source of a certain wavelength that is modulated with the data signal of the channel. The channels may be multiplexed together for transmission through the fiber.

FIG. 1 is a diagram illustrating an optical communication system 100. Transmitters 101–102 receive input information channels 120–121. Those skilled in the art will appreciate that many more than two, e.g., several hundred, channels may be used although only two are shown here to simplify the figure. Transmitters 101–102 may be long reach transmitters (LRTRs) that convert the input information channels 120–121 from electrical signals to optical information modulated around preset wavelengths. These optical channels are then combined by wavelength division multiplexer (WDM) 103 into a single WDM signal and transmitted over fiber link 115. Fiber connection 115 may include a number of optical fibers, each of which carries WDM signals, as well as repeaters 105 that, among other things, amplify the WDM signal.

The receiving side of communication system 100 includes WDM 110 and receivers 111–112. WDM 110 demultiplexes the received WDM signal into the original channels (wavelengths). Receivers 111–112 receive the demultiplexed optical channels and convert them back to electrical signals.

WDM signals traveling through fiber connection 115 experience chromatic dispersion. Dispersion refers to the fact that the different wavelengths in the WDM signal travel at different speeds in fiber connection 115. These different speeds cause the waveforms to become distorted as they travel through the fiber connection 115. In part, this dispersion can be managed by inserting fiber segments having appropriate dispersion characteristics along the fiber connection 115. While this reduces the average dispersion across the fiber connection 115, there remains some residual, wavelength dependent dispersion to be compensated.

One technique for compensating for this residual dispersion involves inserting a length of dispersion compensating optical fiber into the path of each optical signal. WDM 103 and/or WDM 110, for example, may include such a length of optical fiber for each of its input optical channels. An example of this technique can be illustrated by the situation in which each of a plurality of optical transmitters are connected to an array waveguide (AWG) through differing lengths of dispersion compensating fiber. Both the length and the type (i.e., positive or negative dispersion compensation) are selected based upon the expected residual dispersion associated with the wavelength (channel) at which each transmitter is operating. The required length of the dispersion compensating fiber can be relatively large (e.g., 80 km) for channels that require significant residual compensation. As more channels are added to the system, the amount of dispersion compensating fiber used in the WDM 103 and/or 110 quickly becomes a significant expense as well as increasing the size of the unit which causes it to use up valuable floor space in, e.g., a cable landing station. Moreover, the lossy nature of such parallel dispersion compensation schemes may require a large number of amplifiers.

Thus, there is a need in the art to be able to more efficiently multiplex and demultiplex optical channels in optical transmission systems.

SUMMARY OF THE INVENTION

Systems and methods consistent with the principles of the invention, among other things, provide for improved optical transmission/reception techniques.

One aspect consistent with the invention is directed to an optical transmission system for transmitting optical channels. The optical transmission system includes a first group of multiplexing units arranged in cascade with one another. The multiplexing units are configured to receive a predetermined number of the optical channels and output a WDM signal based on the predetermined number of received channels and based on a WDM signal from a previous one of the first group of multiplexing units in the cascade of multiplexing Units. Further, the optical transmission system includes dispersion compensation fibers each associated with one of the multiplexing units. The dispersion compensation fibers receive the WDM signals output from the associated multiplexing units. The dispersion compensation fibers have a length based on a length of fiber required to compensate for dispersion expected to be experienced by the input optical channels of the associated multiplexing unit and based on a length of fiber implemented in succeeding dispersion compensation fibers associated with the cascaded multiplexing units.

A second aspect consistent with the present invention is a method of transmitting optical channels through an optical fiber. The method includes combining the optical channels into a WDM signal via a group of multiplexing units implemented in cascade with one another. Additionally, the method includes compensating WDM signals output from each of the multiplexing units for optical dispersion. This compensation is performed by transmitting the optical channel output from a particular one of the multiplexing units through a predetermined length of dispersion compensating optical fiber, the predetermined length being set based on the length of optical fiber required to compensate for dispersion expected to be experienced by the WDM signal and based on a length of compensation fiber implemented in succeeding multiplexing units of the cascade of multiplexing units.

A third aspect consistent with the invention is directed to a system for receiving optical channels. The system includes demultiplexing units arranged in cascade with one another. Each of the demultiplexing units includes an input line configured to receive a first WDM signal that contains a number of optical channels, a number of output lines each configured to output a single optical channel, and a composite output line configured to output a second WDM signal. Further, the system includes dispersion compensation fibers associated with the demultiplexing units, each of the dispersion compensation fibers having a length based on a length of fiber required to compensate for dispersion experienced by the first WDM signal and based on a length of compensation fiber implemented in preceding dispersion compensation fibers associated with the cascaded demultiplexing units.

A fourth aspect consistent with the invention is directed to a system that includes modular multiplexing units, an underwater optical network, and modular demultiplexing units. The modular multiplexing units each include a first input line configured to receive a WDM signal, second input lines each configured to receive a single optical channel, and a composite output line configured to output a WDM signal containing information received at the first input line and the second input lines. The modular demultiplexing units include a third input line configured to receive a WDM signal, output lines each configured to output a single optical channel, and a second composite output line configured to output a WDM signal containing information relating to a group of optical channels.

A fifth aspect of the present invention is directed to a method for upgrading an optical communication system. A first set of WDM channels having a first average dispersion value associated therewith is initially provided to the optical communication system. Then, the optical communication system is upgraded by adding a second set of WDM channels having a second average dispersion value associated therewith. The first average dispersion value is less than said second average dispersion value.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Implementations consistent with the present invention provide for a cost effective and modular approach to. multiplexing and demultiplexing optical channels. More particularly, in one system, a number of modular multiplexing units can be assembled in a cascade fashion to form a larger multiplexing unit. The modular multiplexing units share dispersion compensation fiber across multiple ones of the modular multiplexing units. A corresponding demultiplexing unit is also constructed of modular units and may similarly share dispersion compensation fiber.

Figure 1:
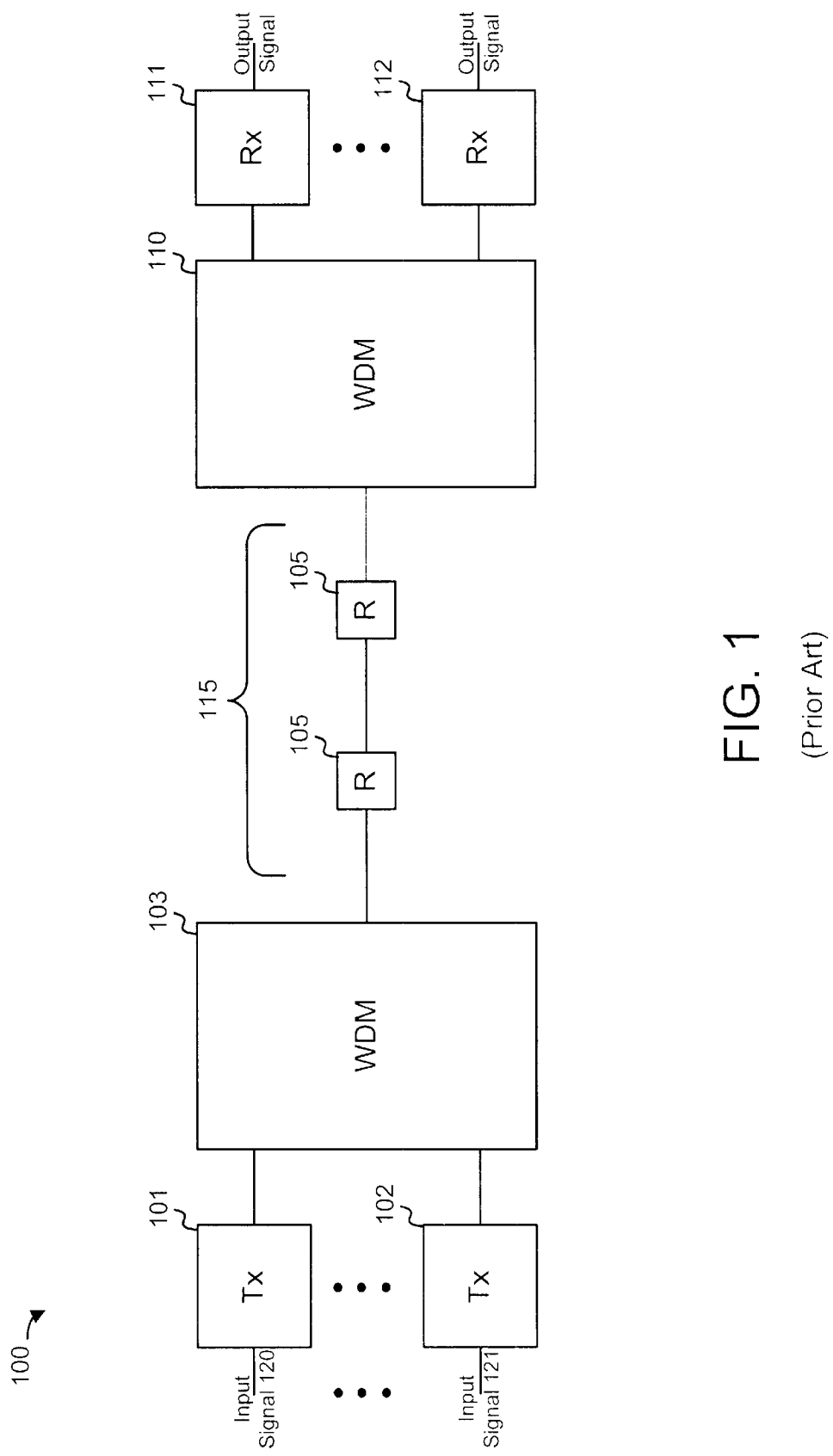
FIG. 1 is a diagram illustrating a conventional optical communication system.
Figure 2:
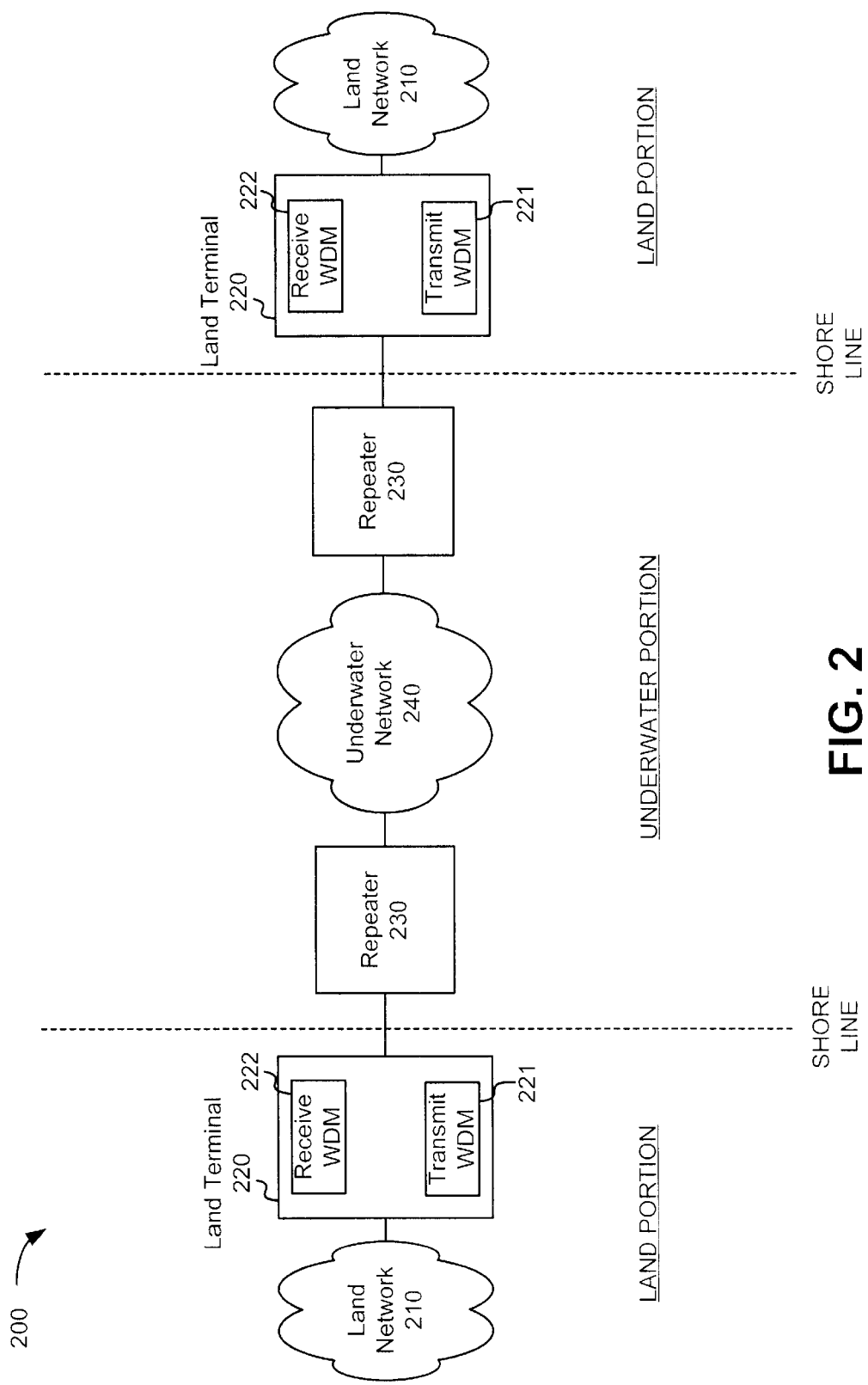
FIG. 2 illustrates an exemplary system in which systems and methods consistent with the present invention may be implemented.

FIG. 2 illustrates an exemplary system 200 in which systems and methods consistent with the present invention may be implemented. As illustrated, system 200 includes two land communication portions that are interconnected via an underwater communication portion. The land portions may include land networks 210 and land terminals 220. Land terminals 220 may include corresponding transmit and receive side WDMs 221 and 222, respectively. The underwater portion may include repeaters 230 and an underwater network 240. Two land networks 210, land terminals 220, and repeaters 230 are illustrated for simplicity. It will be appreciated that a typical system may include more or fewer devices and networks than are illustrated in FIG. 2. Those skilled in the art will appreciate that the present invention is equally applicable to optical communication systems or units that are used in purely terrestrial applications, i.e., those applications which have no underwater portion.

The land network 210 may include one or more networks, such as the Internet, an intranet, a wide area network (WAN), a local area network (LAN), or another type of network. Land terminals 220 convert signals received from the land network 210 into optical signals for transmission to the repeater 230, and vice versa. The land terminals 220 may connect to the land network 210 via wired, wireless, or optical connections. In an implementation consistent with the present invention, the land terminals 220 connect to the repeaters 230 via an optical connection.

The land terminals 220 may include, for example, in addition to WDMs 221 and 222, long reach transmitters/receivers that convert signals into an optical format for long haul transmission and convert underwater optical signals back into a format for transmission to the land network 210. The land terminals 220 may also include optical conditioning units that amplify optical signals prior to transmitting these signals to repeaters 230, and line current equipment that provides power to the repeaters 230 and underwater network 240.

The underwater network 240 may include groups of repeaters and/or other devices capable of routing optical signals in an underwater environment. The repeaters 230 include devices capable of receiving optical signals and transmitting these signals to other repeaters 230 via the underwater network 240 or to land terminals 220.

As mentioned, land terminals 220 include transmit and receive side WDMs 221 and 222. WDMs 221 and 222, in addition to multiplexing or demultiplexing optical signals, may compensate for dispersion experienced by the optical signals as they are transmitted through the optical fiber that connects the land terminals 220. In one aspect consistent with the principles of the invention, WDMs 221 and 222 are implemented as an arrangement that includes modular multiplexing and demultiplexing units.

Figure 3:
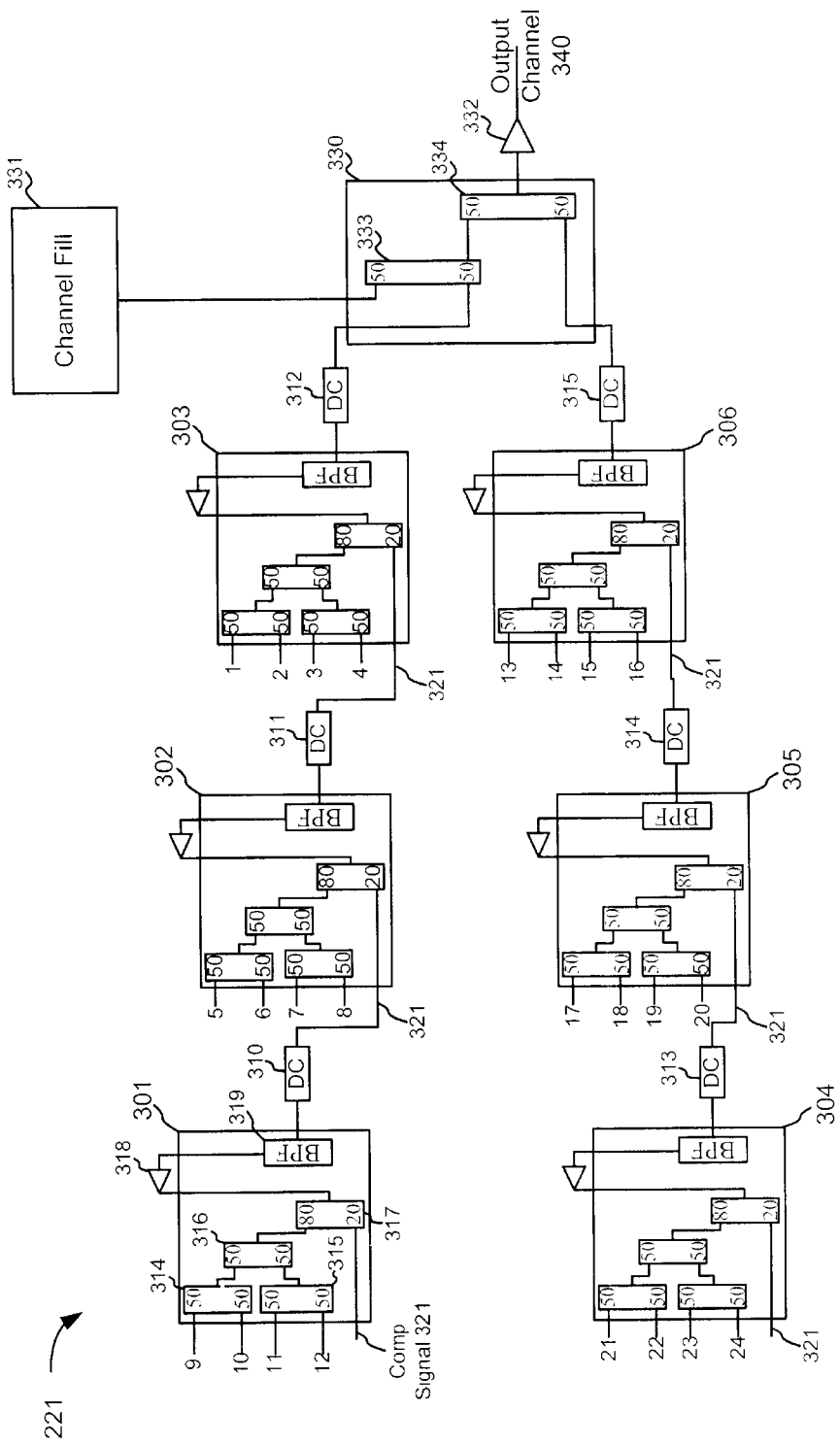
FIG. 3 is a diagram illustrating an implementation of a transmit side wave division multiplexer (WDM) consistent with principles of the invention.

FIG. 3 is a diagram illustrating an implementation of transmit side WDM 221 consistent with the principles of the invention. Transmit WDM 221 includes a number of modular multiplexing units 301–306, which may be connected as a first cascade of modular multiplexing units 301–303 and a second cascade 304–306. Each of multiplexing units 301–306 receives a number of input channels (labeled as channels 1–24), each previously modulated at a specified wavelength, and combines these channels into a WDM signal which includes the information from all of input channels 1–24.

Modular multiplexing units 301–306 may each receive four optical input channels. Modular multiplexing unit 301, for example, receives input channels 9–12 Optical couplers 314–316, of modular modulation unit 301, combine input channels 9–12 into a single optical signal. These four combined input channels 9–12 may additionally be combined with an input WDM signal 321 via coupler 317. In this example, since modular multiplexing unit 301 is the first multiplexing unit in the series of multiplexing units 301–303, the input composite line 321 of multiplexing unit 301 does not currently provide any input to coupler 317. The composite signal line 321 into the succeeding multiplexing units 302 and 309–123, however, carries the combined channel information of the input channels 9–12. The WDM signal from optical coupler 317 may be further passed through amplifier 318 and bandpass filter (BPF) 319 before leaving modular multiplexing unit 301.

Dispersion compensation (DC) components 314–315 are located at the composite signal input 321 of modular multiplexing units 301, 302, 303, 304, 305, and 306. In one implementation, dispersion compensation components 314–315 are each predetermined lengths of optical fiber designed to offset optical dispersion of the signal as it travels between the land terminal components 220. The DC components are described in more detail below.

Optical couplers 314–316 may be "50/50" optical couplers, meaning that the power in the output signal of the coupler includes a 50% contributions from each of its two input signals. Optical coupler 317 may be an "80/20" optical coupler, in which 80% of the output power signal is passed from the input corresponding to the newly combined input channels and 20% of the power is passed from the input corresponding to the WDM signal 321. The selection of the 80/20 ratio for optical coupler 317 is based on a tradeoff between loss leading into the coupler 317 and gain in amplifier 318. One skilled in the art will recognize that other ratios instead of 80/20 for optical coupler 317 or 50/50 for optical coupler 316 could be used.

Amplifier 318, in one implementation, may be an erbium doped fiber amplifier (EDFA) that has a large dynamic range. Amplifier 318 compensates for loss experienced by the optical signals as they travel through the modular multiplexing unit 301. Although amplifier 318 is shown external to modular multiplexing units 301, in other implementations, the amplifier 318 may be implemented internally to multiplexing units 301–306.

BPF 319 performs a bandpass filtering function. In general, amplifier 318 generates noise in the amplified version of its signal across the whole band. The useful signal information, however, may be confined to a narrow band. BPF 319 suppresses noise in the non-signal portion of the band. Details of the construction of BPFs are well known in the art and will not, therefore, be described further herein.

Although optical couplers 314–317, amplifier 318, and BPF 319 were described in the context of modular multiplexing unit 301, these elements may be identically implemented in modular multiplexing units 302–306. In general, because multiplexing units 301–306 are designed as modular units, they can be exchanged or substituted for one another at will.

The WDM signal 321 from the upper modular multiplexing units 301–303 and the lower modular multiplexing units 304–306 are combined in final multiplexing unit 330. Final multiplexing unit 330 includes two 50/50 optical couplers 333 and 334. Optical coupler 333 receives the composite signal from modular multiplexing unit 303 as one input and the output of channel fill component 331 as the other input. Optical coupler 334 receives the composite signal from modular multiplexing unit 306 (via DC unit 315) as one input and the output of optical coupler 333 as the other input.

Channel fill component 331 provides an output signal to optical coupler 333 that is used to fill out the spectrum of WDM signal 340. More particularly, it is desirable to provide a predetermined amount of optical power throughout the entire signal band during operation, even when some channels are not being used. To this end, channel fill component 331 adds a "dummy" signal to portions of the signal band not used by any of the input channels. Thus, for example, if the number of input channels is increased, channel fill component 331 can be adjusted to remove one or more dummy signals (or reduce the optical power of one or more dummy signals) in the portion of the signal band where new input channels are going into service. An exemplary implementation of channel fill component 331 is described in more detail in copending, commonly assigned U.S. patent application Ser. No. 09/939,783, entitled "Methods of Signal Substitution for Maintenance of Amplifier Saturation", filed on Aug. 28, 2001, the contents of which are hereby incorporated by reference.

Amplifier 332 amplifies the signal from final multiplexing unit 330. Amplifier 332 may be, for example, an EDFA or Raman amplifier. In an alternate implementation, final multiplexer unit 330 may be a modular multiplexing unit such as multiplexing units 301–306.

As previously mentioned, dispersion compensation components 310–315 may each include a predetermined length of dispersion compensating optical fiber designed to offset optical dispersion that will be introduced into the WDM signal as it travels through fiber connection 115. In one aspect of the invention, dispersion compensation components 310–312 and 313–315 are arranged in a cascade fashion such that input signals requiring more dispersion compensation are passed through more dispersion compensation components before becoming part of output channel 340. As shown in FIG. 3; for example, input channel number 9 passes through three dispersion compensation components (310, 311, and 312) while input channel number 5 only passes through two dispersion compensation components (311 and 312). Additionally, those channels requiring positive dispersion compensation are handled in one branch (e.g., modular multiplexing units 301–303), while those channels requiring negative dispersion compensation are handled in another branch (e.g., modular multiplexing units 304–306).

The operation of dispersion compensation components 314–315 will be further described with reference to FIG. 4.

Figure 4:
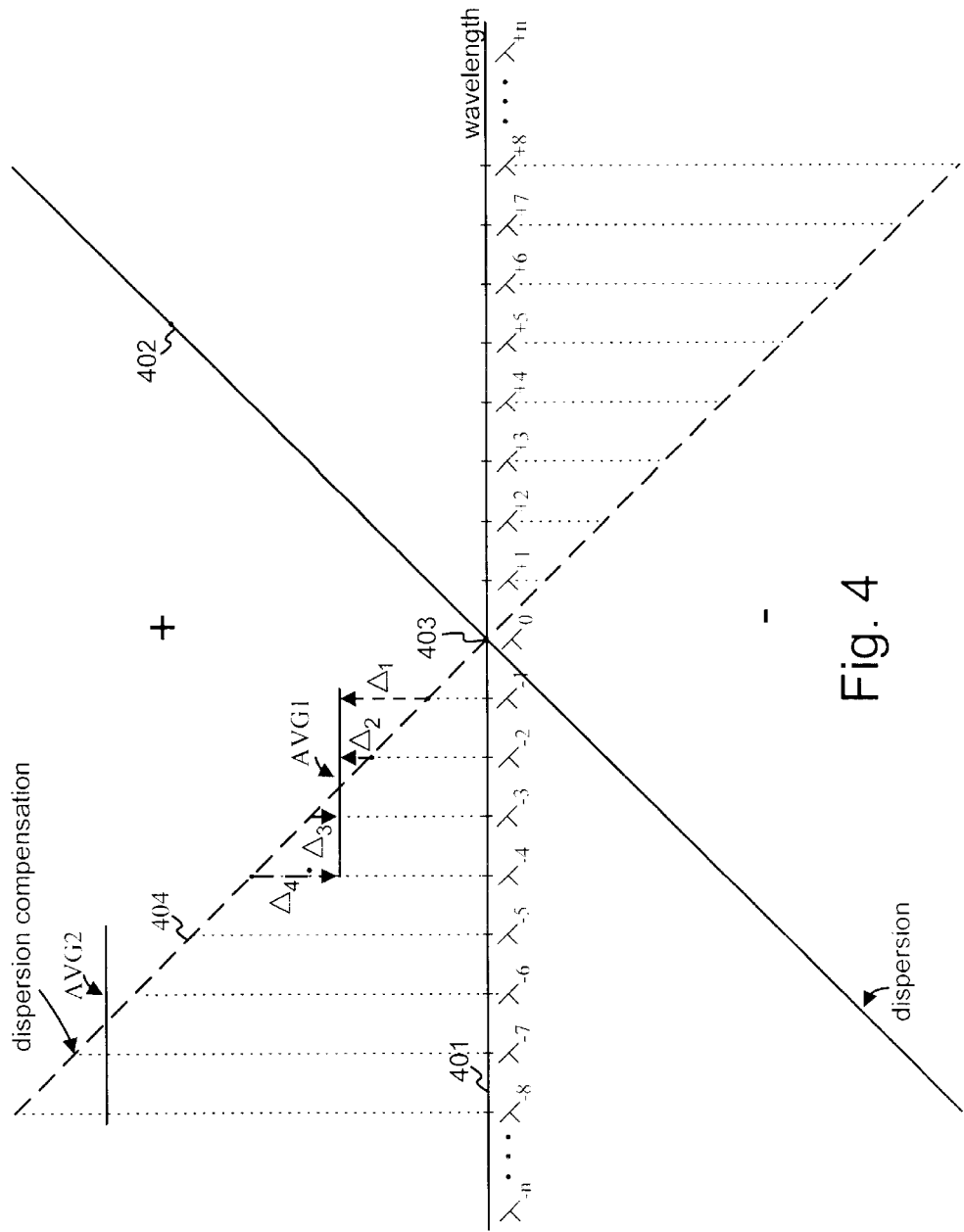
FIG. 4 is a diagram that conceptually illustrates dispersion experienced by optical signals.

FIG. 4 is a graph illustrating the effect of residual dispersion as a function of carrier wavelength in an optical fiber. Horizontal axis 401 represents the wavelength of the carrier light wave and line 402 illustrates dispersion introduced by the fiber. As shown, at center wavelength 403 ($\lambda_0$), the dispersion is essentially zero. To the right of wavelength 403 (lambda $\lambda_{+1}$, $\lambda_{+2}$, . . . , $\lambda_{+n}$) the fiber introduces positive dispersion to the signals. To the left of wavelength 403 (lambda $\lambda_{-1}$, $\lambda_{-2}$, . . . $\lambda_{-n}$) the fiber introduces negative dispersion to the signals. Dispersion correction curve 404 represents the amount of dispersion correction required to compensate for the dispersion introduced according to dispersion curve 402. As shown, to the left of wavelength 403, negative dispersion introduced by fiber connection 115 requires a compensation fiber with a positive dispersion factor to offset the introduced negative dispersion. Similarly, to the right of wavelength 403, positive dispersion introduced by fiber connection 115 requires a compensation fiber with a negative dispersion factor.

Consistent with the principles of the invention, instead of using a separate compensation fiber for each wavelength, the signals from multiple wavelengths, such as $\lambda_{-1}$, $\lambda_{-2}$, $\lambda_{-3}$, and $\lambda_{-4}$, may be passed through a single compensation component (e.g., compensation component 312) that is based on the average length required by the multiple wavelengths. For example, as shown in FIG. 4, wavelengths $\lambda_{-1}$–$\lambda_{-4}$ may be initially passed through a single compensation fiber having a length corresponding to "AVG1." In this situation, the four resultant signals would each contain a measure of residual dispersion error, shown as $\Delta_1$–$\Delta_4$ in FIG. 4. This residual dispersion error may be corrected on a per-channel basis. In general, the length of compensation fiber required to correct the per-channel residual dispersion error is significantly less than the fiber used in dispersion compensation components 314–315.

Modular multiplexing units 301–306 implement compensation fiber averaging as described in the previous paragraph. The four input channels 1–4 for modular multiplexing unit 303, for example, are combined in modular multiplexing unit 301 and then passed through a single compensation component 312. The length of the compensation fiber in compensation component 312 is set to the average compensation length required by input channels 1–4.

In addition to using a single compensation component across multiple (e.g., four) input channels, the serial arrangement of modular multiplexing units 301–303 and 304–306 allow the various lengths of compensation fibers to be set based on a sum of the lengths of the compensation components. Assume that input channels 1–4 have carrier wavelengths $\lambda_{-1}$–$\lambda_{-4}$ (FIG. 4), respectively, while input channels 5–8 have carrier wavelengths $\lambda_{-5}$–$\lambda_{-8}$. AVG2 is greater than AVG 1, and thus requires a greater length of positive dispersion compensation fiber than the wavelengths of AVG1. The length of the compensation fiber in compensation component 312 may be set to a length corresponding to AVG1. The length of the compensation fiber in compensation component 311, however, may be set to a length corresponding to the difference in lengths between the compensation fibers required for AVG1 and AVG2. Similarly, the length of the compensation fiber in compensation component 310 is set to a length corresponding to the difference between the average compensation length required for input channels 9–12 and the sum of the compensation fiber lengths in compensation components 311 and 312.

Additional modular multiplexing units may be added to the chain of modular multiplexing units 301–303 by adding the additional units to the left (in FIG. 3) of modular multiplexing unit 301. The carrier wavelengths for the four input channels to the additional modular multiplexing unit may be the next four available wavelengths (i.e., wavelengths $\lambda_{-13}$–$\lambda_{-16}$). The additional modular multiplexing unit would include a corresponding additional dispersion compensation component having a length of compensation fiber set to the incremental increase in the average corresponding to $\lambda_{-13}$–$\lambda_{-16}$ over the total length seen by dispersion compensation component 310.

Modular multiplexing units 304–306 are implemented similarly to modular multiplexing units 301–303, except that the carrier wavelengths for input optical channels 13–24 are to the right of center wavelength 403. Accordingly, these input channels require compensation components 313–315 that introduce negative dispersion into the their input channels. Thus, in these compensation components, fiber is used that is designed to introduce negative dispersion to the signal.

Figure 5:
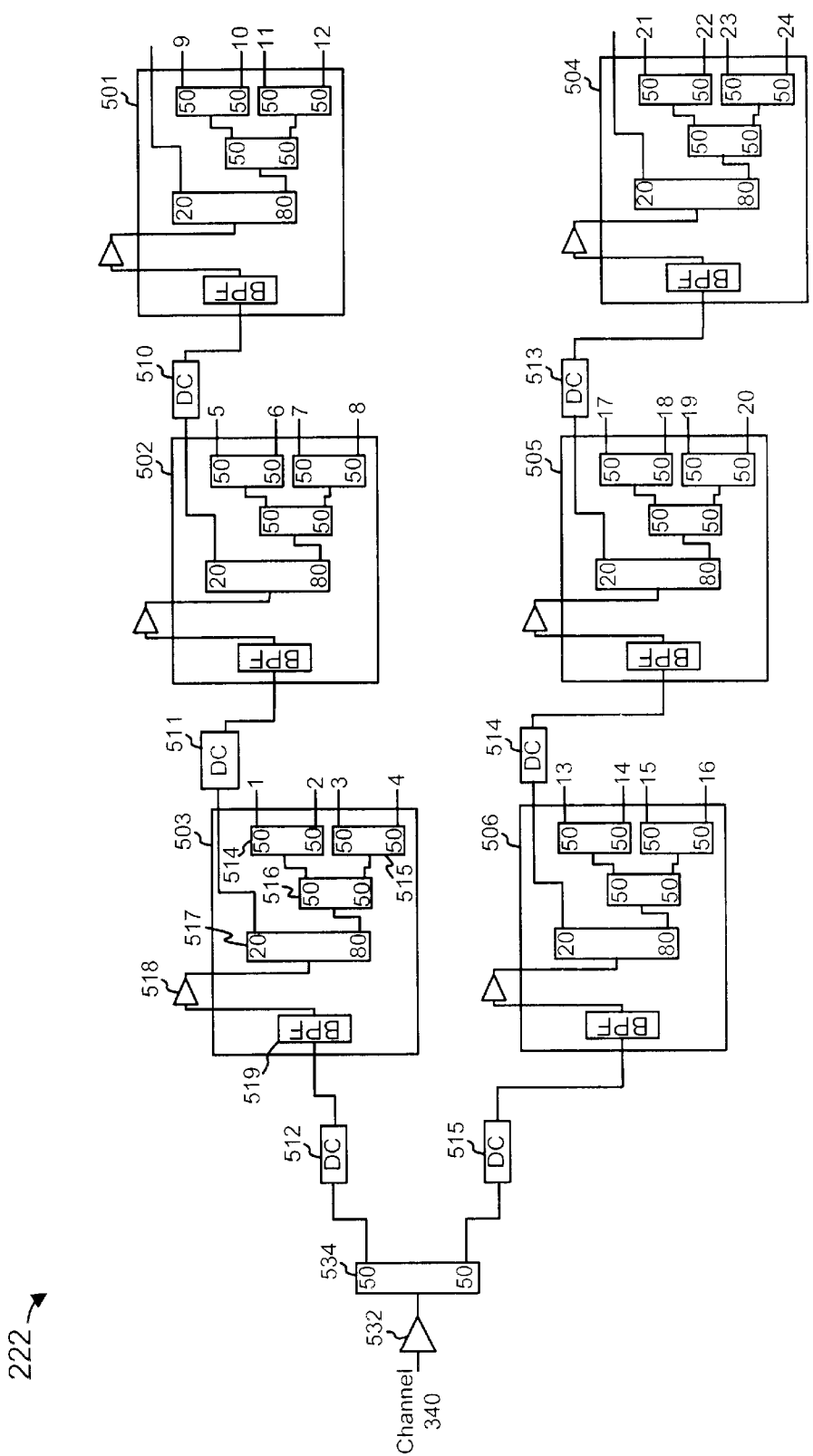
FIG. 5 is a diagram illustrating an implementation of a receive side WDM consistent with principles of the invention.

FIG. 5 is a diagram illustrating an exemplary implementation of a receive side WDM 222. Receive side WDM 222 demultiplexes the optical channels that were combined by transmit side WDM 221. As with transmit side WDM 221, receive side WDM includes modular units which may be connected in a cascade arrangement and uses shared dispersion compensation components.

As shown in FIG. 5, the received WDM signal 340 is initially passed through amplifier 532 and 50/50 optical coupler 534. Optical coupler 534 generates the two WDM signals corresponding to the channels from modular multiplexing units 301–303 and 304–306. Each of the two WDM signals may then pass through the series of demultiplexing modular. units 501–503 or 504–506 and the corresponding dispersion compensation components 510–512 or 513–515.

Modular demultiplexing units 501–506 will now be described in more detail with particular reference to modular demultiplexing unit 503. Modular demultiplexing unit 503 includes a BPF 519, an amplifier 518, an 80/20 optical coupler 517, and three 50/50 optical couplers 514–516. BPF 519 and amplifier 518 are similar to BPF 319 and amplifier 318 in the transmit side WDM 221. Specifically, BPF 519 narrows the spectrum to filter out channels that are not being processed by the branch or unit of interest and to avoid saturating the amplifier 518, which is a wide-band amplifier that enhances the signal output from BPF 519. The signal output from amplifier 518 is passed through 80/20 optical coupler 517. The 50/50 optical couplers 514–516 receive one output of the 80/20 optical coupler 517 and operate to produce the original four input channels 1–4. The second output from the 80/20 optical coupler 517 is transmitted from modular demultiplexing unit 513 for further processing by modular demultiplexing unit 502.

Dispersion compensation components 510–515 operate similarly to dispersion compensation components 314–315. In one implementation consistent with the concepts of the invention, half of the total residual dispersion compensation required for any set of input channels is performed at the transmit side WDM 221 and the other half of the required dispersion compensation is performed at the receive side WDM 222. In this implementation, dispersion compensation component 312, for example, would contain half the required length of compensation fiber for channels 1–4 and dispersion compensation component 512 would contain the other half of the required compensation fiber. In other implementations, complimentary dispersion compensation components may be implemented with ratios other than 50/50 and may even be implemented so that all of the dispersion compensation is performed at one of the transmit or receive side WDMs.

As described, transmit and receive side WDMs 221 and 222 function to effectively transmit and receive optical signals over an optical connection. The transmit and receive side WDMs are constructed from a number of modular units in which additional modular units can be added as needed when upgrading existing systems. Further, the modular units effectively share dispersion compensation fiber and require fewer amplifiers, thus decreasing overall system cost.

Figure 6B:
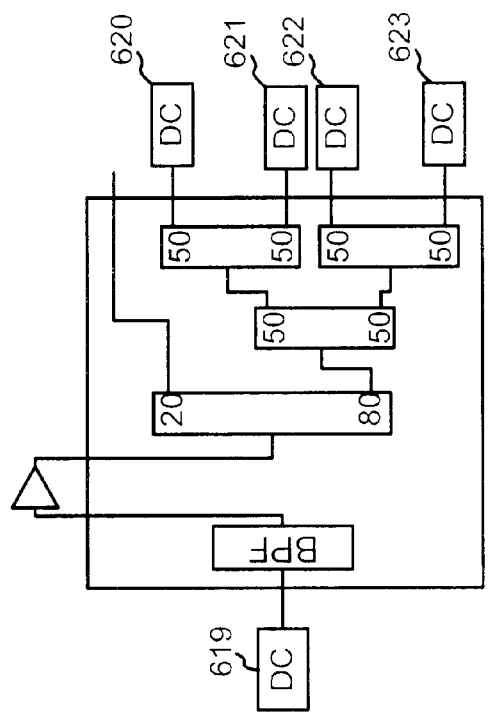
FIGS. 6A and 6B are diagrams illustrating alternate implementations of the modular multiplexing units shown in FIGS. 3 and 5.
Figure 6A:
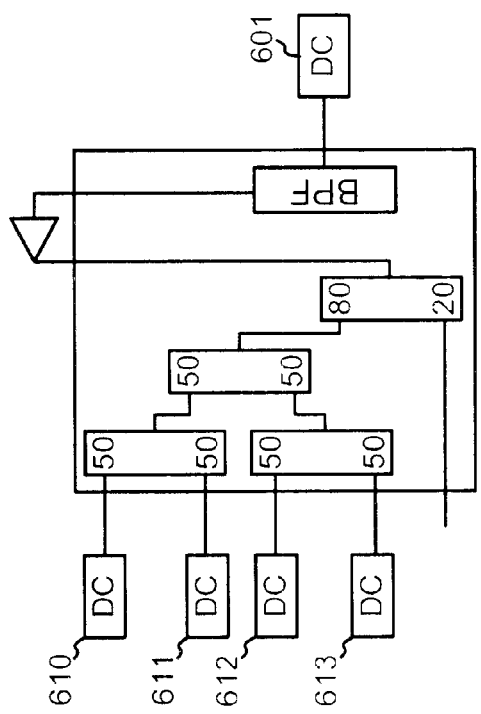

FIG. 6A is a diagram illustrating an implementation of modular multiplexing units 301–306 that include per-channel dispersion compensation components 610–613 as well as a main dispersion compensation component 601. Main dispersion compensation component 601 could be any of dispersion compensation components 314–315. Per-channel dispersion compensation components 610–613 generally require much less fiber and may be used to "fine-tune" the dispersion compensation for any particular channel. Compensation components 610–613 may, for example, be used to eliminate the residual dispersion $\Delta_1$–$\Delta_4$ (FIG. 4). FIG. 6B is a diagram illustrating an implementation of modular demultiplexing units 501–506 that include per-channel dispersion compensation components 620–623 as well as a main dispersion compensation component 619. Dispersion compensation components 620–623 function similarly to components 610–613.

Figure 7:
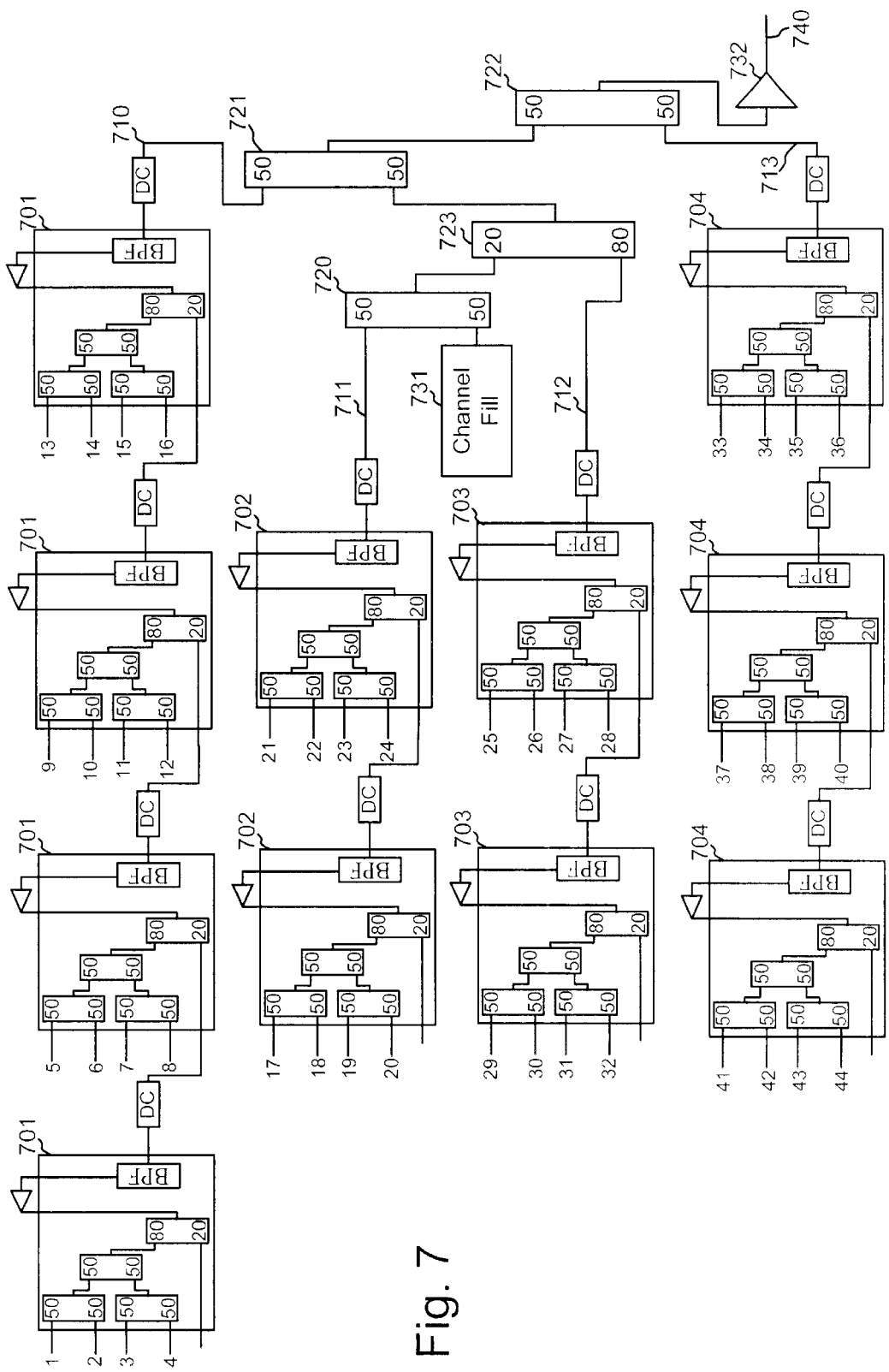
FIG. 7 is a diagram illustrating an alternate implementation of a transmit side WDM consistent with principles of the invention.

FIG. 7 is a diagram illustrating an alternate implementation of the transmit side WDM consistent with principles of the invention. In this implementation, the transmit side WDM includes four cascades of modular multiplexing units. The first cascade includes the four modular multiplexing units 701, the second cascade includes the two modular multiplexing units 702, the third cascade includes the two modular multiplexing units 703, and the last cascade includes the three modular multiplexing units 704. In this manner, the four composite output signals 710–713, encompassing 44 input channels, are produced by the four cascades.

Output channels 710–713 are further combined into a WDM signal 740 through 50/50 optical couplers 720–722 and 80/20 optical coupler 723. Channel fill component 731 functions similarly to channel fill component 331 and provides an output signal that is used to fill out the spectrum of the final output signal 740. More particularly, as shown in FIG. 7, 50/50 coupler 720 receives WDM signal 711 and the output of channel fill component 731. The output of 50/50 coupler 720 is input to 80/20 coupler 723 along with WDM signal 712. The output of 80/20 coupler 723 is then combined with WDM signal 710 by 50/50 coupler 721, the output of which is then combined with WDM signal 713 by 50/50 coupler 722. Amplifier 732 may amplify the final output signal 740 before transmission to the underwater portion of the network. Amplifier 732 may be similar to amplifier 332.

Figure 8:
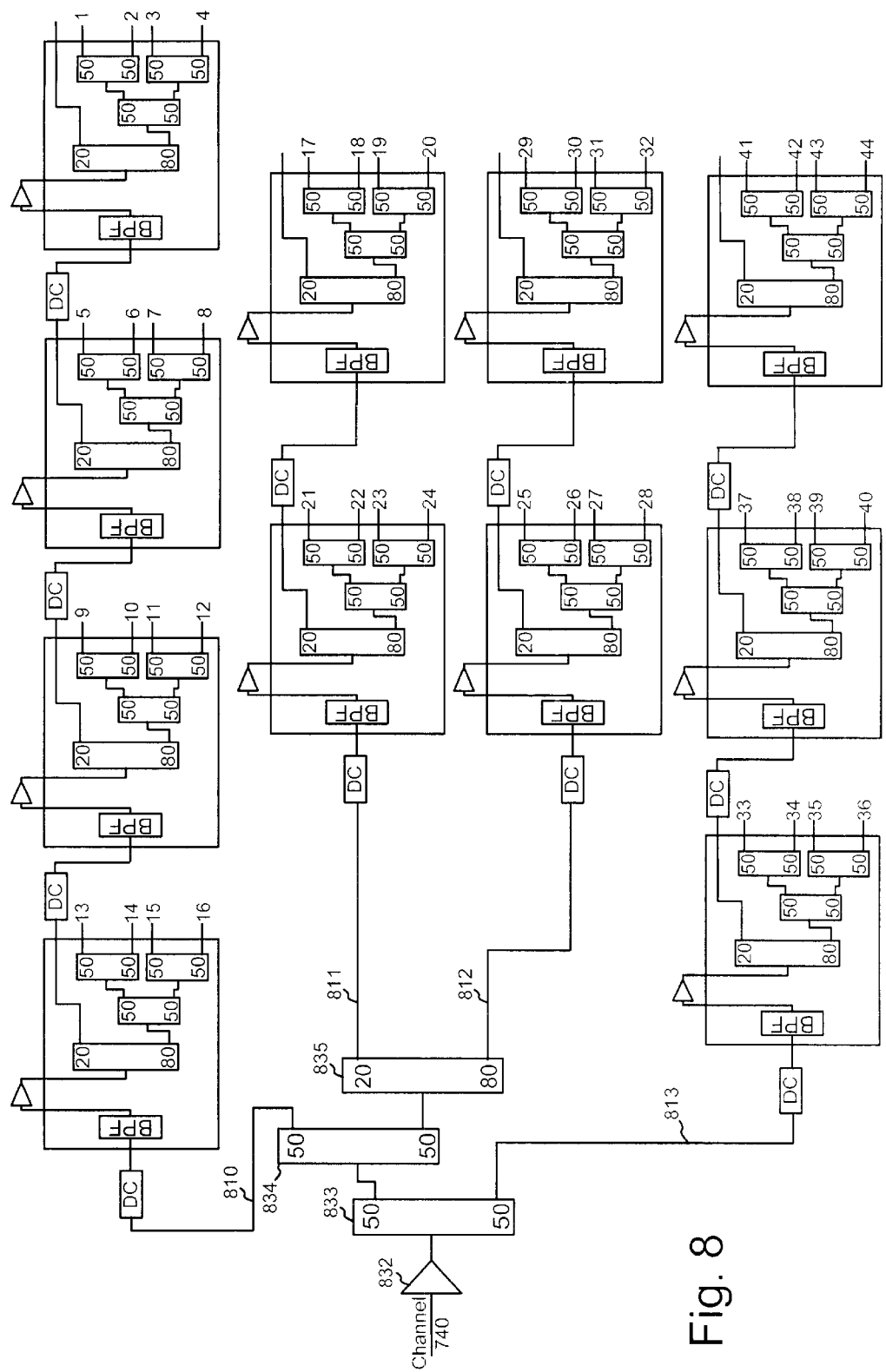
FIG. 8 is a diagram illustrating a receive side WDM corresponding to the transmit side WDM shown in FIG. 7.

FIG. 8 is a diagram illustrating the receive side WDM corresponding to the transmit side WDM illustrated in FIG. 7. As shown, the received channel 740 is initially passed through amplifier 832 and 50/50 optical couplers 833 and 834. One output of 50/50 optical coupler 834 is transmitted to 80/20 optical coupler 835. WDM signals 810–813 are generated by optical couplers 833–835. In a manner similar to the operation of receive side WDM 222, the modular demultiplexing units in the receive side WDM of FIG. 8 recover the original optical channels through a cascade arrangement of the modular demultiplexing units.

Figure 9:
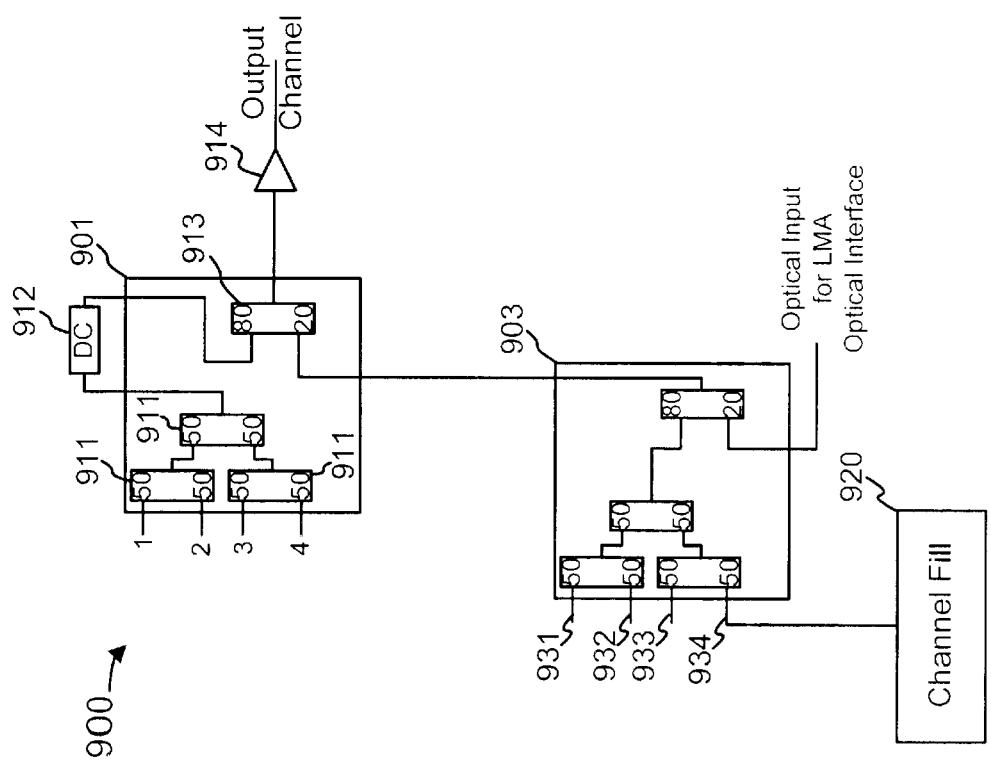
FIG. 9 is diagram illustrating another implementation of a transmit side WDM consistent with principles of the invention.

FIG. 9 is a diagram illustrating another implementation of a transmit side WDM consistent with principles of the invention. Transmit side WDM 900 provides an effective system for upgrading the optical communication channels transmitted through underwater network 240. Transmit side WDM 900 includes multiplexing units 901 and 902. Multiplexing unit 901 may be connected to receive a first group of input channels, shown as four channels, labeled as channels 1–4 in FIG. 9. Channels 1–4 are combined through a series of 50/50 optical couplers 911. The combined channel is then compensated by dispersion compensation component 912 and passed through 80/20 optical coupler 913 to generate the output channel. The output channel is passed through two-stage wholeband amplifier 914 before being leaving WDM 900.

Multiplexing unit 903 is implemented similarly to multiplexing unit 901. However, the input channels received my multiplexing unit 903 are different than those of multiplexing unit 901. When only optical channels 1–4 are being transmitted from WDM 900, multiplexing unit 903 receives, at its fourth input channel (labeled as channel 934), a channel fill signal from channel fill component 920.

When a user wishes to upgrade WDM 900 to transmit more channels, the user may add cascades of modular units, such as modular cascades 301–303 and 304–306 to input channels 931 and 932, respectively, of multiplexing unit 903. These modular cascade of multiplexing units are implemented as described with reference to FIG. 3. Input channel 933 of multiplexing unit 903 receives the input from an additional channel fill component when additional channels are added.

Multiplexing units 901 and 903 are cost effective units because they do not require amplifiers 318 and BPFs 319 associated with modular units 301–306. Accordingly, when initially setting up a network, users may begin just with multiplexing units 901 and 903. When the user wishes to add more optical channels, WDM 900 can be upgraded by adding additional modular multiplexing units such as units 301–306.

Figure 10:
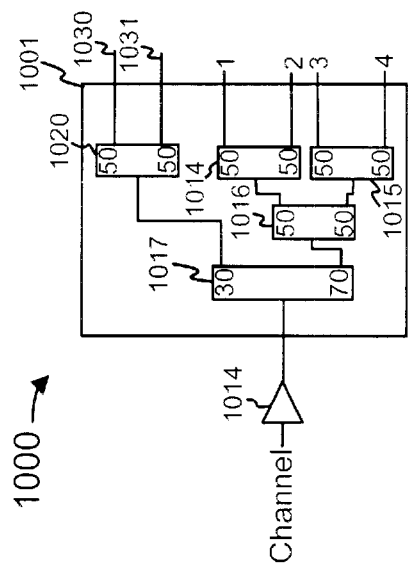
FIG. 10 is a diagram illustrating a received side WDM corresponding to the transmit side WDM shown in FIG. 9.

FIG. 10 is a diagram illustrating an exemplary implementation of a receive side WDM 1000. Receive side WDM 1000 corresponds to transmit side WDM 900. The received composite optical signal is passed through a two-stage wholeband amplifier similar to amplifier 914 and then input to modular unit 1001. Modular unit 1001 includes a 70/30 optical coupler 1017. One output of optical coupler 1017 is passed through a 50/50 optical coupler 1020 to generate the two output channels 1030 and 1031, while the other output of optical coupler 1017 is passed through the series of 50/50 optical couplers 1014–1016. Optical couplers 1014–1016 generate the four optical channels corresponding to input channels 1–4 in FIG. 9. Output channels 1030 and 1031 correspond to input channels 931 and 932 in FIG. 9. These two output channels may be further passed through a cascade of modular units similar to modular units 501–506 to generate additional optical output channels.

Although the modular multiplexing/demultiplexing units described above are shown based on four optical channels, in other implementations, the modular multiplexing/demultiplexing units may each process more or less than four channels.

Moreover, although the dispersion compensation units in the foregoing examples are implemented using lengths of dispersion compensating fiber, any devices which provide for dispersion compensation can be used, e.g., gratings which are adapted to provide dispersion compensation such as those described in U.S. Pat. No. 6,292,603, the disclosure of which is incorporated here by reference.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. An optical transmission system for transmitting a plurality of input channels, the optical transmission system comprising:
  a first plurality of multiplexing units arranged in cascade with one another and each configured to receive a predetermined number of the plurality of input channels and output a WDM signal based on the predetermined number of input channels and based on a WDM signal from a previous one of the first plurality of multiplexing units in the cascade of multiplexing units;
  a second plurality of multiplexing units arranged in cascade with one another and each configured to receive a predetermined number of the plurality of input channels, the input channels being received by the second plurality of multiplexing units experiencing dispersion opposite to the dispersion experienced by the input channels received by the first plurality of multiplexing units; and
  dispersion compensation fibers each associated with one of the first plurality of multiplexing units, the dispersion compensation fibers configured to receive the WDM signals output from the associated multiplexing units and the dispersion compensation fibers having a length based on a length of fiber required to compensate for dispersion expected to be experienced by the input channels of the associated multiplexing unit and based on the length of fiber implemented in succeeding dispersion compensation fibers associated with the cascaded multiplexing units.

2. The optical transmission system of claim 1, wherein the plurality of input channels are based on different carrier wavelengths.

3. The optical transmission system of claim 2, wherein the different carrier wavelengths of the input channels associated with a particular one of the first plurality of multiplexing units are of adjacent wavelengths in the spectrum of wavelengths used by the optical transmission system.

4. The optical transmission system of claim 1, wherein the length of the dispersion compensation fiber is equal to the length of fiber required to compensate for dispersion expected to be experienced by the input channels minus the length of fiber implemented in succeeding dispersion compensation fibers associated with the cascaded multiplexing units.

5. The optical transmission system of claim 1, further comprising:
  a final multiplexing component configured to combine a composite output channel from the second plurality of multiplexing units and the WDM signal output from the first plurality of multiplexing units.

6. The optical transmission system of claim 1, wherein each of the first plurality of multiplexing units includes:
  a series of 50/50 optical couplers configured to receive the predetermined number of the plurality of the input channels and to output a WDM signal representing the predetermined number of the plurality of the input channels; and
  an 80/20 optical coupler configured to receive the WDM signal representing the predetermined number of the plurality of the input channels and the WDM signal from the previous one in the cascade of the first plurality of multiplexing units.

7. The optical transmission system of claim 6, wherein each of the first plurality of multiplexing units further includes:
  an amplifier connected to an output of the 80/20 optical coupler; and
  a bandpass filter connected to an output of the amplifier.

8. A system for receiving optical channels comprising:
  a first plurality of demultiplexing units arranged in cascade with one another, each of the first plurality of demultiplexing units including
    an input line configured to receive a first WDM signal that contains a plurality of optical channels,
    a plurality of output lines configured to output a single optical channel; and
    a composite output line configured to output a second WDM signal;
  a plurality of dispersion compensation fibers associated with the first plurality of demultiplexing units, each of the dispersion compensation fibers having a length based on a length of fiber required to compensate for dispersion experienced by the first WDM signal and based on a length of compensation fiber implemented in preceding dispersion compensation fibers associated with the first plurality of cascaded demultiplexing units; and
  a second plurality of demultiplexing units arranged in cascade with one another and including an input line for receiving a third WDM signal, the third WDM signal experiencing dispersion opposite to the dispersion experienced by the first WDM signal.

9. The system of claim 8, wherein different ones of the optical channels are based on different carrier wavelengths.

10. The system of claim 8, wherein the length of the dispersion compensation fiber associated with a particular one of the first plurality of demultiplexing units is equal to the length of fiber required to compensate for dispersion experienced by the optical channels minus the length of fiber implemented in preceding dispersion compensation fibers associated with the first plurality of cascaded demultiplexing units.

11. The system of claim 8, wherein each of the first plurality of demultiplexing units includes:
  a bandpass filter connected to an output of an amplifier, and
  an amplifier connected to an output of the bandpass filter.

12. The system of claim 11, wherein each of the first plurality of demultiplexing units further includes:
  an 80/20 optical coupler connected to an output of the amplifier; and
  a series of 50/50 optical couplers connected to receive an output of the 80/20 optical coupler.

13. A method for upgrading an optical communication system, comprising the steps of:
  providing a first set of WDM channels having a first average dispersion value associated therewith;
  upgrading said optical communication system by adding a second set of WDM channels having a second average dispersion value associated therewith, wherein said first average dispersion value is less than said second average dispersion value;
  providing a first processing unit for processing said first set of WDM channels; and
  providing a second processing unit for processing said second set of WDM channels,
  wherein said first and second processing units are connected together in series, and
  wherein said first processing unit has a first length of dispersion compensating fiber (DCF) associated therewith and said second processing unit has a second length of DCF associated therewith, such that said second set of channels pass through both said first and second lengths of DCF while said first set of channels pass through only said first length of DCF.

14. A method for upgrading an optical communication system, comprising the steps of:

providing a first set of WDM channels having a first average dispersion value associated therewith;

upgrading said optical communication system by adding a second set of WDM channels having a second average dispersion value associated therewith, wherein said first average dispersion value is less than said second average dispersion value;

providing a first processing unit for processing said first set of WDM channels; and providing a second processing unit for processing said second set of WDM channels, wherein said first and second processing units are connected together in series, and wherein said first and second processing units are disposed in an optical transmitting unit.

15. A method for upgrading an optical communication system, comprising the steps of:

providing a first set of WDM channels having a first average dispersion value associated therewith;

upgrading said optical communication system by adding a second set of WDM channels having a second average dispersion value associated therewith, wherein said first average dispersion value is less than said second average dispersion value;

providing a first processing unit for processing said first set of WDM channels; and providing a second processing unit for processing said second set of WDM channels, wherein said first and second processing units are connected together in series, and wherein said first and second processing units are disposed in an optical receiving unit.

16. A method for upgrading an optical communication system, comprising the steps of:

providing a first set of WDM channels having a first average dispersion value associated therewith;

upgrading said optical communication system by adding a second set of WDM channels having a second average dispersion value associated therewith, wherein said first average dispersion value is less than said second average dispersion value;

providing a first processing unit for processing said first set of WDM channels; and providing a second processing unit for processing said second set of WDM channels, wherein said first and second processing units are connected together in series, and wherein said first and second processing units multiplex said first and second sets of WDM channels, respectively, onto a composite optical signal.

* * * * *